United States Patent [19]

Crovetti et al.

[11] 3,927,100

[45] Dec. 16, 1975

[54] PROCESS FOR PRODUCING AMINO PHENYL IODOMETHYL SULFONES

[75] Inventors: Aldo Joseph Crovetti, Lake Forest; Artur Blank; Richard Paul Germann, both of Waukegan, all of Ill.

[73] Assignee: Abbott Laboratories, North Chicago, Ill.

[22] Filed: Feb. 25, 1974

[21] Appl. No.: 445,715

Related U.S. Application Data

[60] Continuation-in-part of Ser. No. 215,956, Dec. 20, 1971, abandoned, which is a division of Ser. No. 845,097, July 25, 1969, Pat. No. 3,657,353.

[52] U.S. Cl............ 260/578; 260/397.6; 260/562 R; 260/562 P; 260/607 A
[51] Int. Cl.² ........................................ C07C 147/13
[58] Field of Search ............. 260/607 A, 397.6, 578

[56] References Cited

UNITED STATES PATENTS 2,858,341  10/1958  Dole .................................. 260/607

FOREIGN PATENTS OR APPLICATIONS 43-6609  3/1968  Japan.................................. 260/578

*Primary Examiner*—Lewis Gotts
*Assistant Examiner*—S. P. Williams
*Attorney, Agent, or Firm*—Robert L. Niblack; Vincent A. Mallare

[57] ABSTRACT

An improved process for iodinating aminophenyl sulfonyl acetic acids to provide amino phenyl iodomethyl sulfones. The process comprises iodinating the acid with iodine and chlorine in a weakly acidic medium.

5 Claims, No Drawings

PROCESS FOR PRODUCING AMINO PHENYL IODOMETHYL SULFONES

CROSS-REFERENCE TO RELATED APPLICATIONS

This application is a continuation-in-part of co-pending U.S. application, Ser. No. 215,956 filed Dec. 20, 1971, now abandoned, which is a division of U.S. application, Ser. No. 845,097, filed July 25, 1969 which is now U.S. Pat. No. 3,657,353, issued Apr. 18, 1972.

DETAILED DESCRIPTION OF THE INVENTION

This invention relates to an iodination reaction in which substantially all of the iodine added to the reaction mixture participates in a desired iodination step. This invention is especially useful in the preparation of iodomethyl sulfones, particularly diodomethyl sulfones.

According to the prior art, it is known to prepare certain iodomethylsulfones of the formula

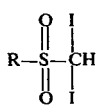

wherein R is phenyl, substituted phenyl and n-alkyl from 4 to about 7 carbon atoms by iodination of the corresponding phenyl, substituted phenyl or alkyl sulfonyl acetic acids. The iodine is introduced in the form of sodium hypoiodite in a strongly alkaline solution. However, under these conditions, about 50 percent of the expensive iodine reagent is converted to sodium iodide and so is not available for reaction. Moreover, the reaction gives poor yields, if any, when R is a group such as tertiary butyl or benzyl.

It is an object of this invention, therefore, to provide an iodination process which gives high conversions based on the iodine.

It is another object of this invention to provide an iodination process broadly applicable to the preparation of iodomethyl sulfones.

It is a further object of this invention to provide a method for the preparation of iodomethylsulfones which is general in that a broad variety of substituted sulfonyl acetic acids can be converted to the diiodo compounds in high yields based both on the sulfonyl acetic acid and the iodine reagents. The term "conversion" indicates the percentage of starting material accounted for in the final product when no allowance is made for recoverable starting material.

These and other objects which will become apparent from the following examples are achieved through the provision of a method in which the iodination is accomplished at a low temperature with iodine and chlorine in a reaction mixture buffered to a weakly acidic pH.

More particularly, a compound susceptible to iodination is dissolved in a buffered acetic acid or water solution. The iodine is added and preferably after all of the iodine is in solution and at least a portion of it has reacted, chlorine is introduced to the reaction mixture. The iodinated product is precipitated and recovered by known procedures.

The starting material is a substituted sulfonyl acetic acid of the formula

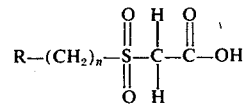

wherein R may be an oxygen, nitrogen or sulfur containing heterocyclic group, alkyl, cycloalkyl, phenyl, loweralkylphenyl, monohalophenyl, aminophenyl, amidophenyl, loweralkoxyphenyl, naphthyl, nitrophenyl, halonitrophenyl, nitroloweralkylphenyl, haloloweralkylphenyl, polyloweralkylphenyl, and polyhalophenyl wherein the halogen may be fluorine, bromine or iodine and n may be an integer from 0 to 4.

The term "loweralkyl" is intended to include those substituents having up to 7 carbon atoms.

By "alkyl", it is meant those substituents having up to about 20 carbon atoms and includes, additionally, those alkyl groups having more than about 20 carbon atoms which do not substantially alter the essential activity or character of the remainder of the molecule.

By "heterocyclic" is meant rings of four to seven members and containing sulfur, oxygen or nitrogen.

The method is especially useful when R is aminophenyl, amidophenyl, phenylloweralkyl, cycloalkylloweralkyl, and lower alkyl, including ethyl, methyl and tertiary butyl because such compounds are frequently difficult to iodinate by known processes. Low yields result in uneconomical production and in diiodomethyl sulfones of low purity.

The aminophenyl (II) and amidophenyl (III) groups are respectively represented by the formulas:

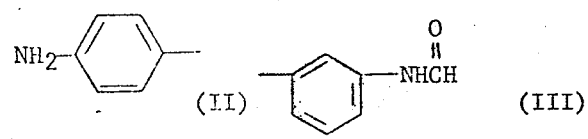

In the present iodinating process, the sulfonyl acetic acids, where R in Formula I is aminophenyl (IV) or amidophenyl (V), are respectively represented by the formulas:

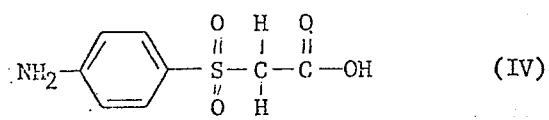

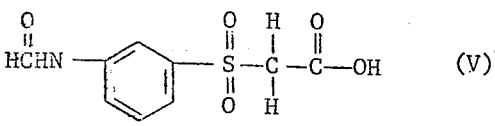

In the preferred embodiment of the present process, the sulfonyl acetic acid is added to glacial acetic acid or an aqueous medium. A basic compound such as sodium hydroxide, ammonium hydroxide or dibasic ammonium phosphate is added to dissolve the sulfonyl acetic acid of Formula I and to buffer the solution at the desired pH.

The control of the pH of the reaction mixture is essential and unless it is maintained within the limits set forth below, low yields will result.

The iodine may be introduced in portions to facilitate temperature control and vigorous agitation is is employed to suspend the heavy iodine particles until they dissolve. Solution of the iodine may be facilitated by addition of small quantities of a solvent such as tetrahydrofuran or methanol.

When solution of the iodine is substantially complete, chlorine is bubbled through the reaction mixture. The iodinated product is decarboxylated and forms a precipitate which is recovered by the usual procedure.

The temperature during the iodination step should be above the freezing point of the reaction mixture and below that temperature at which significant decarboxylation takes place. At higher temperatures, when decarboxylation begins before the iodination is complete, significant concentrations of the monoiodo compound may appear in the final product which is undesirable if the polyiodo compound is the product sought. In general, temperatures above about 50°C. should be avoided. The preferred temperature for the preparation of the diiodo compounds is 12° to 15°C.; toward the end of the reaction a temperature of from 20° to 25°C. may be employed.

The improved results of this invention are obtained when the iodination reaction is performed in a mixture buffered to provide a pH between about 2.5 and about 6 during the reaction and in a preferred embodiment the reaction is carried out at a pH of from about 3 to about 4. At the beginning and end of the reaction period the pH may be somewhat higher.

In the examples immediately following, Example 1 illustrates the preparation of a suitable starting material, para-bromophenyl sulfonyl acetic acid.

EXAMPLE 1

Preparation of Para-Bromophenyl Sulfonyl Acetic Acid

Para-bromophenyl sulfonyl acetic acid is prepared by a two-step oxidation of para-bromophenyl thioglycolic acid with hydrogen peroxide, the sulfoxide being prepared in the first step, the sulfonyl compound in the second. Para-bromophenyl thioglycolic acid (298 g.) is dissolved in 1.1 kg. of glacial acetic acid. While this solution is stirred and maintained at about 20°C., 450 grams of 30% (by weight) hydrogen peroxide are added. This step is exothermic and some cooling may be required. When the temperature has subsided, the reaction mixture is heated at 50°C. to initiate the second step; the oxidation is driven to completion at 75°–80°C. The resulting slurry is set aside for the iodination step which follows.

The following example will illustrate the method of this invention, but is not intended to be limiting.

EXAMPLE 2

Preparation of Para-Bromophenyl Diiodomethyl Sulfone

The reaction mixture from Example 1 comprises a slurry of 337 grams (1.21 moles) of para-bromophenyl sulfonyl acetic acid in 1.1 kilograms of glacial acetic acid and 400 ml. of water. The slurry is cooled to 12°C. and 1.5 moles of aqueous ammonium hydroxide (as about a 15% solution by weight) is added to the mixture with stirring and cooling to keep the temperature below about 15°C. Cooling is continued until the clear solution reaches a temperature of about 10°C., at which time 310 grams (1.22 moles) of iodine and 50 ml. of tetrahydrofuran are added. Vigorous agitation is employed to suspend the iodine particles.

When the heat of reaction following the iodine addition has dissipated and the reaction mixture is again cooled to about 12°C., a second portion of 1.5 mole of diluted aqueous ammonium hydroxide is added at such a rate that the temperature does not exceed 14°C. After about 3 hours, the solution of the iodine particles is complete. During this period, the pH of the reaction mixture is between 3 and 4, and generally about 3.5.

When the iodine crystals have dissolved, 88 grams (1.24 moles) of chlorine are added over a period of about 2 hours and until the dark brown color of the reaction mixture is replaced by a yellowish color. Agitation is continued for one-half hour after the yellow color appears.

By this time, decarboxylation is in progress and precipitation of the product is under way. Addition of 10 grams of anhydrous potassium carbonate in 25 ml. of water in 15 to 20 minutes furthers precipitation of the product. Sodium bisulfite solution is added to the reaction mixture until the reaction is almost colorless. Additions of sodium bisulfite are continued until the yellow color no longer reappears.

The reaction mixture is filtered at about 12°C., the product is washed with 300 ml. of 20% acetic acid and dried in a vacuum oven at 45°C. The yield is about 560 grams, about 95% of theory.

The reaction proceeds equally well when the ammonium hydroxide is replaced by sodium hydroxide to make a sodium acetate-acetic acid buffered solution. Diammonium phosphate may also be used, but control of pH is more difficult when the solution is buffered with this compound.

In the foregoing example, aqueous acetic acid was used as a reaction medium because the sulfonyl acetic acids were readily available in solution in that medium from the previous oxidation step, as indicated in Example 1.

Sulfonyl acetic acids may be prepared by other routes or may be isolated and purified before iodination. With acids prepared by such steps, it may be desirable to perform the iodination reaction in an aqueous solution, an example of which preparation follows.

EXAMPLE 3

Preparation of Para-Bromophenyl Diiodomethyl Sulfone

Previously prepared and dried para-tolylsulfonyl acetic acid (107.1 g., 0.5 mole) is slurried in water (325 ml.) and cooled. The acid is put into solution by neutralization with 26% aqueous ammonia (36.8 g., 40 ml.) and filtered to remove any insoluble material.

The filtrate is agitated and cooled to about 12°C.

Iodine (127 g., 0.5 mole) is added in a single portion which initially causes the temperature to rise a few degrees, but it begins to drop after 10 to 15 minutes. Methanol (50 ml.) is added to assist the solution of the iodine which darkens the reaction mixture. The methanol addition is made in several small portions to limit the temperature rise produced thereby.

The reaction mixture is buffered at a pH of from about 4 to about 6 by the addition of ammonium bicarbonate (42 g., 0.55 mole). The mixture is agitated for about 3 hours at a temperature of about 15°C., during which time much carbon dioxide is given off and most of the iodine is consumed. Chlorine (35.5 g., 0.5 mole) is slowly added over a period of about 3 hours and is introduced as near the bottom of the reaction vessel as possible. The reaction is considered complete when precipitation of the product stops and evolution of carbon dioxide ceases. The product is filtered and washed with an aqueous solution containing 10% methanol. It is dried in the air at 40° to 45°C. to give a yield equal to about 95% of theory.

The monoiodo compounds are readily prepared by adding the proper molar proportions of hydroxide and iodine. The quantity of chlorine may also be correspondingly reduced.

The compound of Example 2 was tested in vitro against fungus *Fusarium oxysporium*, which causes surface rot in sweet potatoes and found to inhibit growth at a concentration of 10 parts per million. The same compound was tested against common bread mold fungus, *Rhizobus nigricans*, which causes soft rot in sweet potatoes and effectively inhibited its growth at a concentration of 100 parts per million.

Other diiodomethylsulfone compounds which are prepared by the process of this invention are: tolyl-, phenyl-, n-heptyl-, aminophenyl-, t-butylphenyl-, bromophenyl-, anisyl-, naphthyl-, n-butyl-, benzyl-, dimethylphenyl-, dichlorophenyl-, chlorophenyl-, chlorobenzyl-, isopropylphenyl-, fluorobenzyl, n-decyl-, and cyclohexyl-.

Monoiodomethylsulfone compounds which are made by the process of this invention are: benzyl-, ethyl- and nitromethylphenyl-.

Without further elaboration, it is believed that one skilled in the art, from the foregoing description and examples, is enabled to use this invention to its fullest extent.

We claim:

1. A method of iodinating a sulfonyl acetic acid of the formula

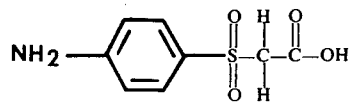

comprising adding the sulfonyl acetic acid to be iodinated to glacial acetic acid, buffering the mixture to a pH of between 2.5 and 6 by addition thereto of a basic compound selected from the group consisting of sodium hydroxide, ammonium hydroxide and dibasic ammonium phosphate, adding iodine to the mixture and stirring at a temperature of from 12° to 25°C. until the iodine is in solution, bubbling one mole of chlorine per mole of acid into the reaction mixture until precipitation of the desired product stops and evolution of carbon dioxide ceases, and recovering the iodinated product.

2. The method of claim 1 wherein the mixture is buffered to provide a pH between about 3 and about 4.

3. The method of claim 1 wherein the molar quantity of the basic compound added is equal to the atomic quantity of iodine added.

4. The process of claim 1 wherein the temperature is maintained at between 12° and 15°C.

5. The method of claim 1 including the step of adding an organic solvent selected from the group consisting of tetrahydrofuran or methanol in an amount sufficient to aid the solution of the iodine.

* * * * *